Dec. 4, 1956  C. H. MAY ET AL  2,772,756
DISK-TYPE BRAKE
Filed Aug. 30, 1952  3 Sheets-Sheet 1

INVENTORS.
Claude Hector May
James E. Ballmer
Thomas M. Trainer
BY *Gray, Mase,*
*Wildermuth & Dunson*
ATTORNEYS.

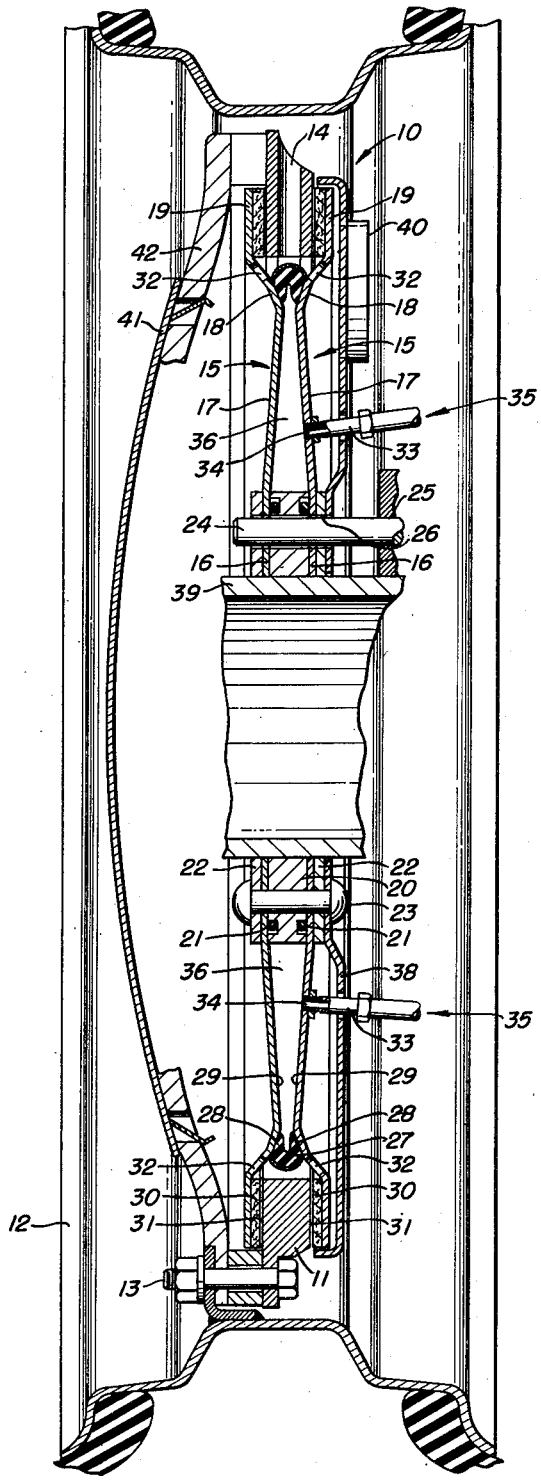
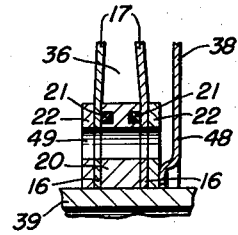
Fig 2
Fig 8
INVENTORS.
Claude Hector May
James E. Ballmer
Thomas M. Trainer
ATTORNEYS.

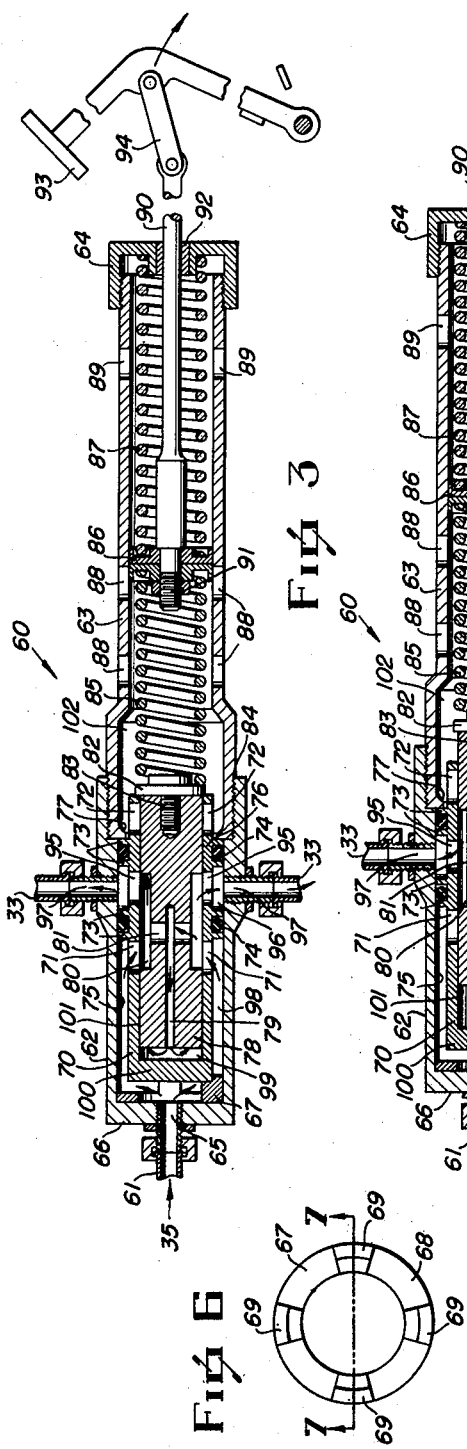
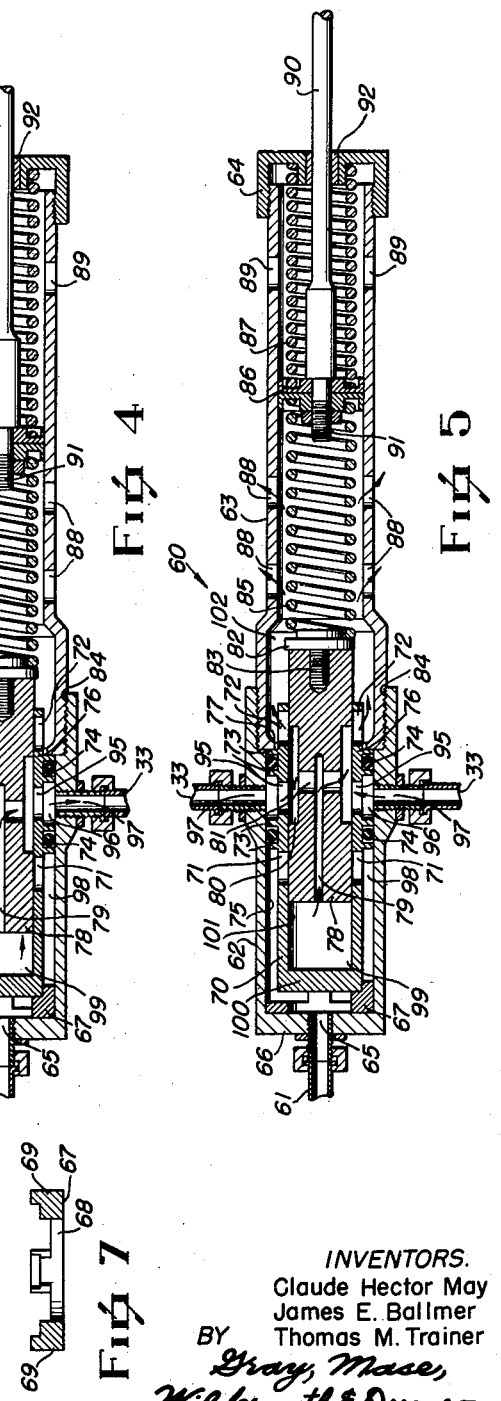

United States Patent Office 2,772,756
Patented Dec. 4, 1956

2,772,756

DISK-TYPE BRAKE

Claude Hector May, Columbus, James E. Ballmer, Canal Winchester, and Thomas M. Trainer, Columbus, Ohio, assignors, by direct and mesne assignments, to The Murray Corporation of America, Detroit, Mich., a corporation of Delaware Application August 30, 1952, Serial No. 307,356

15 Claims. (Cl. 188—152)

This invention relates to a brake. It has to do, more particularly, with a disk-type brake including brake disks of novel construction and a novel control valve for fluid pressure used in controlling the application of the brake. This brake may be used to control any suitable rotatable member, such as the wheel of a vehicle. An important application of this brake is its use as an automobile brake, and, although it is not limited to such application, the description herein is, for convenience directed primarily to the use of the brake on the wheel of an automobile.

This brake can be made much lighter than an equivalent brake of the type conventionally used on automobiles, since it is inherently easier to cool and does not require a heat sponge in the form of large volumes of metal to prevent excessive temperature rise, and since the braking effort is supplied by spring force in the disks acting essentially against themselves rather than against another member which would have to be made to resist the force. The brake is controlled by means of external power, which is utilized to release the brake rather than to apply the brake. This external power is controlled by a novel control valve which provides a natural "feel" to the operator, for optimum control of the braking action, although the effort required by the operator is used only to control the braking effort, not to supply it. The brake is provided with air-cooling means, which also cleans the braking surfaces between times when the brake is applied. The brake disks are self-centering about a brake ring to provide even distribution of wear and consequent longer brake life. The brake may be constructed as a unit that can be easily and quickly installed on, removed from, and replaced on, a wheel of an automobile.

It is a primary object of this invention to provide a brake having the foregoing features and advantages, and other features and advantages that will be apparent from the following description.

It is another object of the present invention to provide a brake having a brake ring, a pair of brake disks oppositely disposed about the brake ring, mechanical connecting means holding the inner portions of the brake disks in fixed, spaced relationship to each other, a fluid that is normally under pressure between the disks, and means for controlling the pressure of the fluid.

It is also an object of this invention to provide a brake, as described above, in which the fluid is present between the brake disks in an annular space between a substantially annular outer seal and a substantially annular inner seal between the disks, the fluid normally forcing the outer portions of the disks apart to maintain friction lining, attached to the disks, away from contact with the brake ring, and in which adjustable valve means provides braking by reducing the fluid pressure so as to permit the disks to press the friction lining against the brake ring.

A further object is to provide a disk-type spring having a substantially flat inner first portion, an intermediate second portion comprising a shallow, conical surface portion, an intermediate third portion comprising a steep conical surface portion, and a substantially flat, outer fourth portion.

Still another object of this invention is to provide a control valve having an outer valve body connected to a supply of fluid under pressure, an inner valve body having at least one inlet port, at least one outlet port, and at least one control port, and a slidable valve piston inside the inner valve body having means for connecting the control port selectively to the other ports, as required for control of the pressure of the fluid to the control port.

The apparatus hereinafter described, and illustrated in the accompanying drawings, accomplishes the foregoing objects.

In the drawings:

Figure 2 is a cross-sectional view of the brake illustrated in Figure 1, taken on the line 2—2 of Figure 1;

Figure 3 is a longitudinal sectional view of a brake control valve according to the present invention, showing the movable piston thereof in an extreme position, and including a conventionalized view in reduced scale of a brake pedal mechanically linked to the control rod of the valve;

Figure 4 is a view similar to Figure 3 of the control valve only, showing the movable piston in an intermediate position;

Figure 5 is a view similar to Figure 4, showing the movable piston of the control valve in an extreme position opposite to that shown in Figure 3;

Figure 6 is an elevational view of a supporting member used in the control valve of Figures 3, 4, and 5;

Figure 7 is a cross-sectional view of the supporting member illustrated in Figure 6 taken on the line 7—7 of Figure 6; and Figure 8 is a fragmentary cross-sectional view of a portion of the brake, taken on the line 8—8 of Figure 1.

Figure 1:
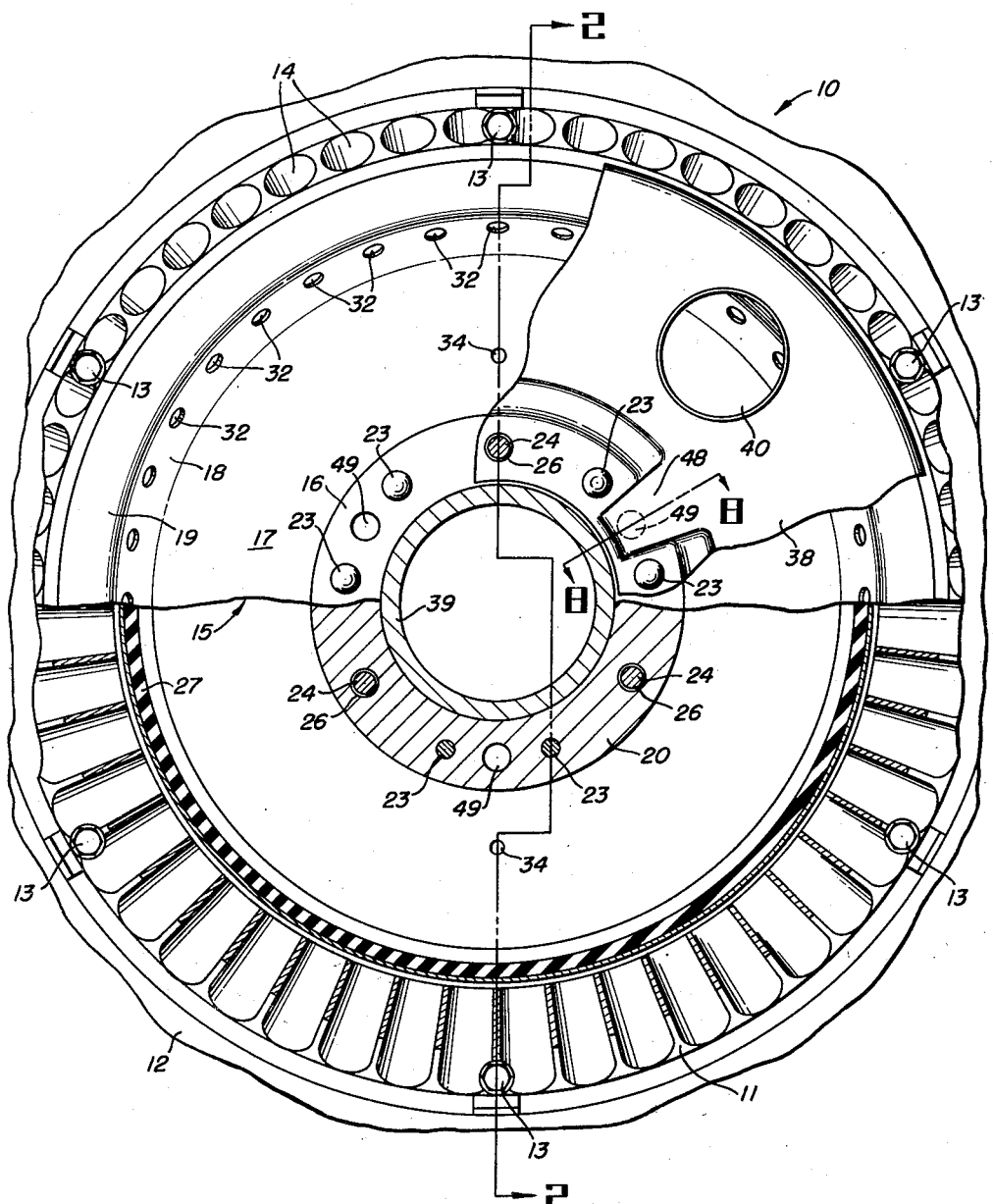
Figure 1 is an elevational view partially in cut-away section of a brake incorporating features of the present invention.

Referring to Figures 1 and 2, a brake assembly according to the present invention is indicated generally by the reference numeral 10. One member in the brake 10 is a brake ring 11 which may be fixedly attached to a rotatable member, such as a wheel 12 of a vehicle, by lug bolts 13—13. Radial openings or cooling holes 14 through the brake ring 11 are provided to permit the flow of air through the brake ring 11 for cooling.

Oppositely disposed about the brake ring 11 are a pair of brake disks 15—15. Each of the brake disks 15, preferably made of steel, comprises a surface of revolution, and has an annular, substantially flat, inner first portion 16, substantially perpendicular to the axis of the disks 15—15 which coincides with the axis of rotation of the wheel 12. An annular, intermediate second portion 17, comprising the lateral surface of a shallow conical frustrum, extends from the first portion 16 of each disk 15 toward the other disk 15. An annular, intermediate third portion 18 comprising the lateral surface of a steep conical frustum extends from the second portion 17 of each disk 15 away from the other disk 15. An annular, outer fourth portion 19 extends from the third portion 18 of each disk 15 in a direction substantially perpendicular to the axis of the disks 15—15.

The inner portions 16—16 of the disks 15—15 are firmly clamped and held in fixed, spaced relationship to each other by mechanical connecting means comprising: an inner annular seal composed of a ring-shaped supporting member 20 and a pair of O ring seals 21—21, between the disks 15—15; a pair of annular back-up plates 22—22 on the outside of the inner portions 16—16 of the disks 15—15; and clamping rivets 23—23 holding the backing plates 22—22 tightly against the inner portions 16—16 of the disks 15—15. The clamping rivets 23—23 also hold a cover plate 38 against one of the backing plates 22. The hub of the wheel 12 may be rotatably mounted in a brake hub 39. Anchor pins 24—24, each of which may be attached to a fixed point such as to a flange on the axle, as is indicated at 25, fit through holes 26—26 in the disk assembly, supporting the brake disks 15 in such a manner as to prevent rotary movement of the disks 15—15 but to permit movement of the disks 15—15 parallel to the axis of the brake ring 11, thereby providing a self-centering action of the disks 15—15 about the brake ring 11.

An annular-shaped outer seal 27 is located between the brake disks 15—15 in the boundary region between the second and third portions 17 and 18 of each disk 15. Inwardly projecting lips 28—28 press tightly against the inner surfaces 29—29 of the disks 15—15 and follow any inward or outward movement of the disks 15—15. The outer seal 27 may be made of reinforced rubber or other suitable resilient sealing material. A flat ring of friction lining 30, which may be made up of a plurality of flat segments, is attached to the inner surface 29 of the outer portion 19 of each disk 15 in the space between the inner surface 29 of the disk 15 and the outer surface 31 of the brake ring 11 opposite thereto. A large number of circularly distributed openings or cooling holes 32—32 are provided through the third portions 18—18 of the disks 15—15 to afford paths for air flow to cool the brake ring 11 and the friction lining 30—30.

A pair of supply lines 33—33 supply a fluid, preferably air, normally under pressure, through two fluid inlets 34—34 in one of the brake disks 15. A fluid 35 is thus applied to the substantially annular space 36 bounded by the outer seal 27, the inner seal 20, 21—21, and the second portions 17—17 of the brake disks 15—15. The pressure of the fluid 35 normally is great enough to force the second, third, and fourth portions 17—17, 18—18, 19—19 of the disks 15—15 apart, so that the friction lining 30—30 attached to the inner surfaces 29—29 of the outer portions 19—19 of the disks 15—15 normally is out of contact with the outer surfaces 31—31 of the brake ring 11. When the pressure of the fluid 35 is decreased, however, the disks 15—15 seek a more relaxed shape, and the spring action in the disks 15—15 forces the portions 17—17, 18—18, and 19—19 inwardly, forcing the outer portions 19—19 of the disks 15—15 toward the brake ring 11 and pressing the friction lining 30—30 against the outer surfaces 31—31 of the brake ring 11.

The cover plate 38 is provided with a cooling air intake opening 40, which may be connected in any suitable manner to a conventional air scoop mounted on the vehicle. On the side opposite the cover plate 38, the brake 10 is covered by a hub cap 41 which fits into holes in a member 42 of the wheel 12. If desired, however, a second cover plate, without the air intake opening, could be placed on the opposite side of the brake 10 to protect the components from physical damage and could be held by the rivets 23 in the same manner in which the cover plate 38 is held. As is illustrated in Figure 1 and Figure 8, portions 48—48 of the cover plate 38 are so shaped as to permit the passage of cooling air from the intake opening 40, between the cover plate 38 and the right disk 15, through transverse passages 49—49, between the left disk 15 and the hub cap 41, through the cooling holes 32—32 in the third portion 18 of the left disk 15, and out through the radial cooling openings 14 in the brake ring 11 as well as out through the space between the brake ring 11 and the friction lining 30 attached to the outer portion 19 of the left disk 15.

The brake 10 operates as follows:

During normal operation of the vehicle with the brake not applied, the pressure of the fluid 35 in the annular space 36 between the inner seal 20, 21—21 and the outer seal 27 forces apart the second portions 17—17 of the disks 15—15. With the inner portions 16—16 of the disks 15—15 clamped rigidly in place by the rivets 23—23, the distributed force produced by the pressure of the fluid 35 in the annular space 36 provides outward movement of the outer portions 19—19 of the disks 15—15 in a direction substantially perpendicular to the outer surfaces 31—31 of the brake ring 11. The surfaces of the friction lining 30—30 are thus maintained substantially parallel to the outer surfaces 31—31 of the brake ring 11, providing uniform wear on the friction surfaces.

Since the inner portion of the brake assembly, comprising the ring-shaped supporting member 20, the O ring seals 21—21, the inner portions 16—16 of the disks 15—15, the backing plates 22—22, and the inner portion of the cover plate 38, all held together rigidly by the rivets 23, is slidably mounted with light friction on the brake hub 39 and on the anchor pins 24—24, a self-centering action is provided at every application of the brake.

The brake ring 11 is rigidly attached to the wheel 12 by the lug bolts 13—13, and rotates with the wheel 12 when the vehicle is in motion. Rotation of the disks 15—15, however, is prevented by the anchor pins 24—24 which are attached to the flange on the axle, as is indicated at 25, and fit through the holes 26—26 in the disk assembly to provide a nonrotatable mounting of the disks 15—15. The brake is cooled by air entering the intake opening 40 of the cover plate 38, and passing through the circularly distributed cooling holes 32—32 in the third portions 18—18 of the disks 15—15 and through the radial cooling holes 14 in the brake ring 11 out to the atmosphere. From the intake opening 40 of the cover plate 38 a portion of the cooling air flows through the cooling holes 32—32 in the third portion 18 of the right disk 15 and out through the radial cooling holes 14 in the brake ring 11, while another portion of the cooling air flows between the cover plate 38 and the right disk 15, through the transverse passages 49—49 to the other side of the brake 10, continuing between the left disk 15 and the hub cap 41, through the cooling holes 32—32 in the third portion 18 of the left disk 15, and out through the radial cooling openings 14 in the brake 11 to the atmosphere. Cooling air is thus provided from both sides of the brake 10 through the cooling holes 32—32 in both of the brake disks 15—15. The rotation of the brake ring 11 aids the flow of cooling air by providing a centrifugal fan effect. When the brakes are not applied, some cooling air flows from the cooling holes 32—32 in both of the disks 15—15 out between the outer surfaces 31—31 of the brake ring 11 and the friction lining 30—30, as well as through the radial cooling holes 14, thereby cooling the braking surfaces and removing any foreign matter that might otherwise collect on the braking surfaces. The holes 32—32 also form a barrier to the transmission of heat from the lining 30—30 through the outer portions 19—19 of the disks 15—15 to the seal 27.

To apply the brake, the pressure of the fluid 35 in the annular space 36 is reduced, permitting the intermediate portions 17—17 and 18—18 and the outer portions 19—19 to press inwardly against the reduced pressure in the annular chamber 36. The outer portions 19—19 press the friction lining 30—30 against the outer surfaces 31—31 of the brake ring 11, thereby applying a friction load to decelerate the rotation of the brake ring 11 and of the wheel 12, to which the brake ring 11 is rigidly connected by the lug bolts 13—13. Since the anchor pins 24—24 prevent rotation of the brake disks 15—15, the gripping of the brake ring 11 by the pressure of the disks 15—15 and the friction lining 30—30 against the outer surfaces 31—31 of the brake ring 11 can be made either to slow down or stop the rotation of the brake ring 11 and the wheel 12 by controlling the braking force and the length of time during which the braking force is applied. Because the slidable mounting of the brake disks 15—15 permits freedom of movement of the brake disks 15—15 in a direction perpendicular to the braking surfaces 31—31, the gripping force is the same on each of the surfaces 31—31, and the load and wear are evenly divided between the two braking surfaces 31—31, and wear is equally divided between the two pieces of friction lining 30—30.

The movement of the outer portions 19—19 of the disks 15—15 in pressing toward the brake ring 11 is substantially perpendicular to the braking surfaces 31—31 and the inner surfaces of the friction lining 30—30 are maintained substantially parallel to the outer surfaces 31—31 of the brake ring 11, so when contact is made with the braking surfaces 31—31, the entire surfaces come together substantially at the same time rather than a little bit at a time, as would be the case if the surfaces were pressed together while at an angle to each other, and wear is evenly distributed over the braking surfaces and good over-all surface contact is maintained.

To guard against the possibility of a sudden accidental application of the brake that might be caused by an accidental leak or break if only a single fluid line were used to supply the fluid 35 to the annular chamber 36, two fluid lines 33—33 are provided, each supplying the fluid 35 under pressure to a separate fluid inlet 34, so that a break in one of the lines 33 would not cause a sudden collapse of pressure in the annular chamber 36, but the reduction in pressure would be slowed down considerably by the supply of the fluid 35 at high pressure from the other line 33. Thus, the undesired braking action would be gradual rather than sudden, and would be slow enough to avoid danger. If desired, a check valve could be employed at each of the fluid inlets 34—34 to eliminate any accidental braking action from breakage in one of the fluid supply lines 33—33 and to retard considerably the reduction of pressure that might be brought about if both of the fluid supply lines 33—33 were to break.

Since a brake and a clutch are substantially equivalent except that a brake is normally disengaged while a clutch is normally engaged, it is obvious that various adaptations requiring only mechanical skill may readily be made to convert the brake of this invention into a clutch.

Although a brake of the type disclosed herein could be constructed with other forms of disks substituted for the disks 15—15, distinct advantages, some of them unexpected, are obtainable by the use of the novel form of disk-type spring 15, which comprises an annular, substantially flat, inner first portion 16, substantially perpendicular to the axis of the disk-type spring 15; an annular, intermediate second portion 17, comprising the lateral surface of a shallow, conical frustum about the axis of the disk-type spring 15, extending outwardly from said axis and away from the first portion 16; an annular, intermediate third portion 18 comprising the lateral surface of a steep, conical frustum about the axis of the disk-type spring 15 extending outwardly from the second portion 17 and toward the plane of the first portion 16; and an annular, substantially flat, outer fourth portion 19, substantially parallel to the plane of the first portion 16. An important advantage of this shape of the disk 15 accrues from the fact that, with the inner portion 16 clamped rigidly, as in the brake 10, any movement of the outer portion 19 resulting from a change in force on the second portion 17, such as the fluid pressure in the annular chamber 36 of the brake 10, takes place in a direction substantially parallel to the axis of the disk 15. In the brake 10, this movement is such as to maintain the inner surface 29 of the outer portion 19, and the inner surface of the friction lining 30 attached thereto, substantially parallel to the flat surface 31 of the brake ring 11 adjacent thereto. Such movement provides large surface contact with consequent longer wear.

The disk 15, particularly with the inner portion 16 rigidly clamped, provides increased load capacity for a particular material of given thickness. The load capacity can be varied by changing the diameter of the clamped inner portion 16 with increased diameters providing increased load capacities where the other dimensions of the disk 15 remain constant. The spring rate can be changed, and the load curve can be varied by changing the amount of dish in the second portion 17 or in the third portion 18, or by varying the height of either of the portions 17 or 18. By varying these parameters, it is possible to obtain a zero spring rate at various load levels. Such control over the load levels and spring rates is important, of course, in the design of a brake, to provide the desired braking forces and the desired rate of change in braking force for given changes in the mechanism used to control the brake. A low spring rate is desirable so that wear on the brake surfaces will not materially change the braking action. Deflection in the disk 15 produced by changes in loading takes place almost entirely in the second and third portions 17 and 18, so there is no waste motion in the outer portion 19. Therefore, very small deflections are sufficient to move the outer portion 19 to control the braking action of the brake 10, especially since the movement of the outer portion 19 is substantially perpendicular to the braking surface 31 and the inner surface 29 of the outer portion 19 is substantially parallel to the braking surface 31. Tests show that there is very little radial movement of the friction lining 30 on the brake ring surface 31 in applying and releasing a brake using the disk 15, and that only a small amount of deflection of the disk 15 is needed to apply or release the brake. Therefore, low stress and consequent long fatigue life are obtainable. The foregoing features of the disk-type spring 15, while especially advantageous in the brake of the present invention, make the disk 15 useful for other purposes also for which disk-type springs or washers customarily are employed.

The shape of the disk 15 is such that in the annular space 36 the distance between the inner surfaces 29—29 of the disks 15—15 is minimized so as to require only a small volume of the fluid 35 to provide the pressure for operation of the brake. Also, the shape is such that the outer seal 27 may have the maximum possible diameter inside the brake ring 11 with only enough space between the outer seal 27 and the brake ring 11 to permit the flow of cooling air through the radial cooling holes 14. Maximum diameter of the outer seal 27 provides maximum force from the pressure of the fluid 35 in the annular space 36 since the area over which the pressure of the fluid 35 is present increases as the square of the diameter of the outer seal 27 and the lever arm increases with increase in the diameter of the outer seal 27. Maximum diameter of the outer seal 27 is obtainable with the disk 15 because the cooling holes 32 are located in the steep portion 18 and do not extend in from the inner diameter of the brake ring 11 as far as would the same sized holes on a shallow surface or on a flat surface. Locating the cooling holes 32—32 in the steep portion 18 of the disk 15 has the added advantage of providing a smoother path for the flow of cooling air through the holes 32 and the radial cooling holes 14 in the brake ring 11 than would be possible if the portion 18 were shallow or flat rather than steep.

It is apparent that a brake according to the present invention can be made to be much lighter than an equivalent brake of the type conventionally used on automobiles. This is true partly because the brake of the present invention is inherently easier to cool and does not require a heat sponge in the form of large masses of metal to prevent excessive rise in temperature. Another factor is that the braking effort is supplied by the spring-type disks 15—15, acting through the brake ring 11, against themselves rather than against another member which would have to be heavy enough to resist the force. The brake 10 is power-controlled, but the external power is utilized to release the brake rather than to apply the brake, and braking energy is stored in the spring-type disks 15—15 themselves. The air-cooling means in the brake 10 not only cools the brake ring 11 by the flow of air through the radial cooling holes 14, but also cools and cleans the braking surfaces by the flow of air between the surfaces 31—31 of the brake ring 11 and the friction lining 30—30, when the brake is off. The brake 10 is self-centering so that wear on the friction lining 30—30 and on the braking surfaces 31—31 is evenly distributed and longer brake life is thereby obtained. As is apparent from the drawings, the brake 10 may be constructed as a unit that is easily and quickly installed on, or removed from, a wheel by means of the lug bolts 13, and replacement of the entire brake unit can be made quickly and easily merely by disconnecting the fluid lines 33—33, sliding the brake 10 off the anchor pins 24 and the brake hub 39, sliding a new brake unit 10 onto the anchor pins 24—24 and the brake hub 39 and connecting the fluid lines 33—33 to the fluid inlets 34—34.

For optimum operation of the brake 10, the pressure of the fluid 35 in the annular chamber 36 should be conveniently adjustable. Referring now to Figures 3–7, a control valve for the brake 10 is indicated generally by the reference numeral 60. The fluid 35, preferably air, is supplied to the control valve 60 through a fluid line 61 which is connected to a compressor or other suitable source of fluid under pressure. In an automobile, compression in the engine may be utilized to provide a supply of high-pressure air to the fluid line 61. The components of the control valve 60 are held in a casing comprising an outer valve body 62, a spring enclosure 63, and a spring-end retainer 64. The fluid line 61 is connected to an opening 65 in the end wall 66 of the outer valve body 62. An inner valve body support 67 is located against the end wall 66 of the outer valve body 62. The support 67, which is shown separately in Figures 6 and 7, includes a flat, ring-shaped base 68, and stepped shoulders 69—69 protruding from the base 68 and spaced apart circumferentially on the ring-shaped base 68.

Seated in the stepped shoulders 69—69 of the support 67 is an inner valve body 70. The inner valve body 70 comprises a cylindrical shell open at its right end and having inlet ports 71—71, outlet ports 72—72 and two brake assembly control ports 95—95. Around the outside of the inner valve body 70 are two pairs of outwardly protruding ring-shaped lips 73—73, each pair enclosing an O ring 74. The O rings 74—74 provide fluid-tight seals between the inner cylindrical surface 75 of the outer valve body 62 and the outer cylindrical surface 76 of the inner valve body 70. The annular space 96 between the O rings 74—74 provides a path for the flow of the fluid 35 between the brake assembly control ports 95—95 in the inner valve body 70 and two brake assembly openings 97—97 in the outer valve body 62 to which the fluid lines 33—33 are connected. The inner valve body 70 is held in place by the stepped shoulders 69—69 of the support 67, the inner cylindrical surface 75 of the outer valve body 62, and an inwardly projecting lip 77 at the left end of the spring enclosure 63.

Slidably fitting inside the inner valve body 70 is a valve piston 78, which is a cylindrical member having a central passage 79, an annular passage 80, and a transverse passage 81 between the central passage 79 and the annular passage 80. A piston-spring retainer 82 is connected to the right end of the valve piston 78 by a threaded connection, as is indicated at 83. The spring enclosure 63 is threaded into the outer valve body 62, as is indicated at 84. Inside the spring enclosure 63 is a piston spring 85 which is held at one end by the piston-spring retainer 82 and at the other end by an interspring retainer 86. A control spring 87 in the spring enclosure 63 is held at one end by the interspring retainer 86 and at the other end by the spring end retainer 64.

Escape ports 88—88 are provided in the left half of the spring enclosure 63, and air holes 89—89 are provided in the right half of the spring enclosure 63. The air holes 89—89 are necessary to avoid compression and expansion of air in the right half of the spring enclosure 63. A control rod 90 is connected to the interspring retainer 86 by a threaded connection, as is indicated at 91. The control rod 90 extends to the right through a sleeve 92 in the spring end retainer 64, and may be connected in any suitable manner to a movable control member, such as a foot pedal 93 which is shown in reduced scale in Figure 3 connected through a conventionalized linkage 94 to the control rod 90.

The control valve 60 operates as follows:
Consider the situation in which the brake has been applied and the pressure of the fluid 35 in the annular chamber 36 of the brake 10 has been reduced substantially to atmospheric pressure. When the pressure of the operator's foot on the brake pedal 93 is removed, the control spring 87 and the piston spring 85 force the valve piston 78 to its extreme left position, as is shown in Figure 3. With the valve piston 78 in this extreme left position, the inlet ports 71—71 of the inner valve body 70 are open, as is apparent from Figure 3. The fluid 35, which is supplied from a suitable source to the control valve 60 through the fluid line 61 and the opening 65 in the end wall 66 of the outer valve body 62, flows through the center opening of the inner valve body support 67, through the spaces between the stepped shoulders 69—69 of the support 67, to the annular space 98 between the inner valve body 70 and the outer valve body 62. From this annular space 98, the fluid 35 continues through the inlet ports 71—71 of the inner valve body 70 to the annular passage 80 in the valve piston 78. From the annular passage 80, the fluid 35 flows out through the brake assembly control ports 95—95, the annular space 96, the brake assembly openings 97—97, and the fluid lines 33—33 to the annular chamber 36 of the brake assembly 10. As the pressure of the fluid 35 in the annular chamber 36 increases, the disks 15—15 are forced apart, thereby releasing the brake.

The fluid 35 also flows from the annular passage 80 in through the transverse passage 81 and the central passage 79 of the valve piston 78 to the cylindrical space 99 between the left wall 100 of the inner valve body 70 and the valve piston 78. As the pressure of the fluid 35 increases in the cylindrical space 99, the valve piston 78 is forced to the right against the opposing force of the piston spring 85 and the control spring 87. When the pressure of the fluid 35 in the cylindrical space 99 and in the annular chamber 36 of the brake assembly 10 reaches a predetermined value sufficient to release the brake, the valve piston 78 reaches an equilibrium position, as shown in Figure 4, in which the inlet ports 71—71 of the inner valve body 70 are covered by the cylindrical surface 101 of the valve piston 78, shutting off any further supply of the fluid 35. In the equilibrium position of Figure 4, the force exerted by the pressure of the fluid 35, which tends to push the valve piston 78 toward the right, is balanced by the force from the compressed springs 85 and 87, which tends to push the valve piston 78 toward the left. The position shown in Figure 4 is the normal position of the valve piston 78 of the control valve 60 when the vehicle is in operation and the brake is not being applied.

If a reduction in temperature should cause a decrease in the pressure of the fluid 35 contained in the cylindrical space 99 within the inner valve body 70, the annular chamber 36 of the brake 10, and the connection between, the force of the compressed springs 85 and 87 on the valve piston 78 would exceed the opposing force from the fluid 35, and the valve piston 78 would be forced to the left. When the valve piston 78 is moved to the left, as in Figure 3, additional fluid 35 is admitted to the annular passage 80 through the inlet ports 71—71, and the pressure of the fluid 35 in the cylindrical space 99 and in the annular chamber 36 of the brake 10 increases until the predetermined pressure is reached and the valve piston 78 returns to its equilibrium position of Figure 4.

If a rise in temperature should cause an increase in the pressure of the fluid 35 in the annular chamber 36, the cylindrical space 99, and the connections between, the force exerted on the valve piston 78 by the pressure of the fluid 35 would exceed the force exerted by the compression of the springs 85 and 87, and the valve piston 78 would be forced to the right. Movement of the valve piston 78 to the right of its equilibrium position, as in Figure 5, connects the annular passage 80 to the outlet ports 72—72 of the inner valve body 70, and permits the fluid 35 to escape from the cylindrical space 99 and the annular chamber 36 through the outlet ports 72—72 to the space 102 inside the spring enclosure 63, and through the escape ports 88—88 in the spring enclosure 63, to the atmosphere. In this manner, the pressure of the fluid 35 in the cylindrical space 99 and in the annular chamber 36 is reduced to the predetermined value, and the valve piston 78 returns to the equilibrium position of Figure 4. Thus, the proper pressure is maintained in the annular chamber 36 of the brake 10 to maintain the brake in the released position when not in use, yet avoiding excessive pressure in the annular chamber 36.

To apply the brake, pressure is applied to the foot pedal 93, connected through the linkage 94 to the control rod 90, pulling the control rod 90 toward the right. Movement of the control rod 90 to the right, as in Figure 5, moves the interspring retainer 86, which is connected to the control rod 90, as is indicated at 91, also to the right. The control spring 87 is thereby compressed, and the piston spring 85 expands, reducing the pressure of the piston spring 85 against the valve piston 78. The pressure of the fluid 35 against the valve piston 78 forces the valve piston 78 toward the right, connecting the annular passage 80 with the outlet ports 72—72 and permitting the fluid 35 to escape from the cylindrical space 99 and from the annular chamber 36 of the brake 10 through the annular passage 80, the outlet ports 72—72, the space 102 inside the spring enclosure 63, and out the escape ports 88—88 to the atmosphere. Thus, the pressure of the fluid 35 in the cylindrical space 99 and in the annular chamber 36 is reduced, and the disks 15—15 press together against the reduced fluid pressure in the annular chamber 36, causing the outer portions 19—19 to press the friction lining 30—30 against the outer surfaces 31—31 of the brake ring 11 to achieve the desired brake action.

When the pressure of the fluid 35 is reduced to the point where the force from the fluid 35 tending to push the valve piston 78 to the right equals the reduced force from the piston spring 85 tending to push the piston 78 to the left, the piston will return to an equilibrium position, as in Figure 4. It is apparent that, for every position of the control rod 90, a specific pressure will be obtained in the cylindrical space 99 and in the annular chamber 36 of the brake 10. This pressure decreases, of course, as the control rod 90 is moved to the right until a point is reached where the piston spring 85 exerts no force on the valve piston 78 and the pressure of the fluid 35 is reduced to atmospheric pressure, producing maximum braking. Thus, it is apparent that the amount of braking action can be controlled between no braking and maximum braking by controlling the position of the control rod 90.

For optimum control over the amount of braking, it is desirable that the operator have an indication of the amount of braking that is being obtained. Such an indication is inherent in conventional automobile brakes in which the effort of the operator is required to provide the braking effort. The operator feels the braking action to some extent since the force of the operator's foot on the brake pedal is the force utilized to provide the braking effort, and the operator thus is aware of any increase or decrease in braking effort. Where power-braking is employed, however, to provide increased maximum braking effort and to reduce the effort required by the operator, as in the present invention, it is desirable to supply in the control mechanism an indication of the amount of braking effort developed at any given time.

This indication, or "feel," is provided by the control valve 60. The amount of braking effort obtained at any given instant is a direct function of the position of the control rod 90, increasing as the control rod 90 is moved to the right, and the effort required by the operator to maintain a given position of the control rod 90 also is directly related to the position of the control rod 90, increasing as the control rod 90 is moved to the right. This increase in the effort that is required, as the control rod 90 is moved to the right, results partly from the fact that the force required to compress the control spring 87 increases as the spring 87 is compressed more and more by movement of the control rod 90 to the right. The effect is increased, however, by the action of the piston spring 85 and the pressure of the fluid 35 on the valve piston 78. The pressure of the fluid 35 on the valve piston 78 acts through the piston spring 85 so as to tend to force the interspring retainer 86 and the control rod 90 to the right, but the aiding force from the pressure of the fluid 35 acting through the piston spring 85 is reduced as the braking effort is increased by the reduced pressure of the fluid 35 in the annular chamber 36 of the brake 10. Therefore, increased effort by the operator is required to replace the aiding force, which diminishes as the braking action increases. Thus, the braking effort required by the operator in the control of the braking action, although of much smaller magnitude than would be required if the operator were to supply the braking effort himself, nevertheless is a direct function of the braking effort, increasing as the braking effort increases. Thus, the brake pedal 93 has a natural "feel" to the operator, and optimum control over the braking action is obtained.

From the foregoing disclosure, it is apparent that the control valve 60 provides adjustable valve means comprising an outer valve body 62 connected to a supply of fluid under pressure, an inner valve body 70 having inlet ports 71—71, outlet ports 72—72, and brake-assembly control ports 95—95 connected to the annular space 36 occupied by the fluid 35 between the disks 15—15, and a slidable valve piston 78, inside the inner valve body 70, having means for connecting the brake-assembly control ports 95—95 to the inlet ports 71—71 or to the outlet ports 72—72, selectively, as required for control of the pressure of the fluid 35 between the disks 15—15. It is also apparent that the slidable valve piston 78 is acted upon at its left end by pressure from the fluid 35 in the inner valve body 70, tending to force the valve piston 78 to the right so as to connect the brake-assembly control ports 95—95 with the outlet ports 72—72, and that the valve piston 78 is acted upon at its right end by an adjustable force from a resilient member comprising the piston spring 85 and the control spring 87, tending to force the valve piston 78 in the opposite direction so as to connect the brake-assembly control ports 95—95 with the inlet ports 71—71. It is further apparent that the control valve 60 provides braking by reducing the pressure of the fluid 35 between the disks 15—15 in such manner that the outer portions 19—19 of the disks 15—15 are forced toward the brake ring 11 and press the friction lining 30—30 against the ring 11, and that the control valve 60 includes means for requiring increased adjusting force for increased braking effort, as by requiring increased force on the foot pedal 93 mechanically linked to the control rod 90 of the control valve 60 through the linkage 94, for increased braking effort.

It will be understood, of course, that while the form of the invention herein shown and described is a preferred embodiment of the invention, it is not intended to illustrate all of the equivalent forms or ramifications of the invention; and, that various changes in shape, relative size, and arrangement of parts may be substituted without departing from the spirit or scope of the invention herein disclosed.

What is claimed is:

1. A brake comprising: a brake ring; a pair of brake disks oppositely disposed about said brake ring; mechanical connecting means holding the inner portions of said disks in fixed spaced relationship to each other; a fluid, normally under pressure, between said disks; and means for controlling the pressure of said fluid; each said disks comprising a surface of revolution having: an annular, substantially flat, inner first portion, substantially perpendicular to the axis of said disk; an annular, intermediate second portion comprising the lateral surface of a shallow, conical frustum extending from said first portion toward the other disk; an annular, intermediate third portion comprising the lateral surface of a steep, conical frustum extending from said second portion away from the other disk; and an annular, outer fourth portion substantially perpendicular to said axis of said disk.

2. A brake according to claim 1, in which a plurality of radial openings are provided through said ring, and a plurality of circularly distributed openings are provided through said intermediate third portion of each said disk, to provide means for cooling said ring and said disks.

3. A brake according to claim 1, in which friction lining is attached to each said disk between said disk and said ring, and in which a plurality of circularly distributed openings are provided through said intermediate third portion of each said disk, whereby air is permitted to flow through said openings and between the braking surfaces of said brake ring and said friction lining to provide means for cooling and cleaning said braking surfaces.

4. A brake comprising: a brake ring; a pair of brake disks oppositely disposed about said brake ring; mechanical connecting means holding the inner portions of said disks in fixed spaced relationship to each other; a fluid, normally under pressure, between said disks; and means for controlling the pressure of said fluid including adjustable valve means having means for requiring increased adjusting force for increased braking effort, comprising: an outer valve body connected to a supply of fluid under pressure; an inner valve body having at least one inlet port, at least one outlet port, and at least one brake-assembly control port connected to the space occupied by said fluid between said disks; and a slidable valve piston inside said inner valve body having means for connecting said at least one brake-assembly control port to said at least one inlet port or to said at least one outlet port, selectively, for control of the pressure of said fluid between said disks.

5. A brake according to claim 4, in which said slidable valve piston is acted upon at one end by pressure from said fluid in said inner valve body, and at the opposite end by an adjustable force from a resilient member.

6. A brake according to claim 5, in which said fluid in said inner valve body is so located as to press said slidable valve piston in such direction as to connect said at least one brake-assembly control port with said at least one outlet port, and in which said resilient member is so positioned as to press said slidable valve piston in the opposite direction so as to connect said at least one brake-assembly control port with said at least one inlet port.

7. A disk-type spring comprising: an annular, substantially flat, inner first portion, substantially perpendicular to the axis of said disk-type spring; an annular, intermediate second portion comprising the lateral surface of a shallow, conical frustum about the axis of said disk-type spring extending outwardly from said axis and away from said annular, inner first portion; an annular, intermediate third portion comprising the lateral surface of a steep, conical frustum about the axis of said disk-type spring extending outwardly from said annular, intermediate second portion and toward the plane of said annular, inner first portion; and an annular, substantially flat, outer fourth portion, substantially parallel to the plane of said annular, inner first portion.

8. A disk-type spring comprising: an annular, substantially flat, inner first portion; an annular, intermediate second portion comprising the lateral surface of a shallow, conical frustum; an annular, intermediate third portion comprising the lateral surface of a steep, conical frustum, extending from said second portion toward the plane of said first portion; and an annular, substantially flat, outer fourth portion; said disk-type spring being characterized by the fact that its spring rate and load characteristics can be controlled, and a zero spring rate can be obtained at various load levels, by variation of at least one of the following structural characteristics, the amount of dish in said second portion, the amount of dish in said third portion, the height of said second portion, the height of said third portion.

9. In combination: a disk-type spring comprising an annular, substantially flat, inner first portion, an annular, intermediate second portion comprising the lateral surface of a shallow, conical frustum, an annular, intermediate third portion comprising the lateral surface of a steep, conical frustum, extending from said second portion toward the plane of said first portion, and an annular, substantially flat, outer fourth portion; and means rigidly clamping said inner portion of said disk-type spring to a holding member.

10. Adjustable valve means for controlling fluid pressure comprising: an outer valve body connected to a supply of fluid under pressure; an inner valve body having at least one inlet port, at least one outlet port, and at least one control port connected to a device in which the fluid pressure is to be controlled by said adjustable valve means; and a slidable valve piston inside said inner valve body having means for connecting said at least one control port to said at least one inlet port or to said at least one outlet port, selectively, for control of the pressure of said fluid in said device; in which said slidable valve piston is acted upon at one end by pressure from said fluid in said inner valve body, and at the opposite end by an adjustable force from a resilient member; and in which said fluid in said inner valve body is so located as to press said slidable valve piston in such direction as to connect said at least one control port with said at least one outlet port, and in which said resilient member is so positioned as to press said slidable valve piston in the opposite direction so as to connect said at least one control port with said at least one inlet port.

11. A brake comprising: a brake ring; a pair of brake disks oppositely disposed about said brake ring; mechanical connecting means holding the inner portions of said disks in fixed space relationship to each other; a fluid between said disks normally under pressure greater than atmospheric and sufficient to maintain said brake disks in released position disengaged from said brake ring; and means for controlling the pressure of said fluid including adjustable valve means having variable fluid-pressure means therein for requiring adjusting force of a magnitude that is a direct function of the braking effort.

12. A brake comprising: a brake ring; a pair of brake disks oppositely disposed about said brake ring; mechanical connecting means holding the inner portions of said disks in fixed spaced relationship to each other; a fluid between said disks normally under pressure greater than atmospheric and sufficient to maintain said brake disks in released position disengaged from said brake ring; and means for controlling the pressure of said fluid including mechanically adjustable valve means mechanically linked to a foot pedal and having variable fluid-pressure means therein for requiring force on said foot pedal of a magnitude that is a direct function of the braking effort.

13. A brake comprising: a brake ring fixedly attached to a rotatable member; a pair of brake disks oppositely disposed about said brake ring; mechanical connecting means holding the inner portions of said disks in fixed spaced relationship to each other; a fluid between said disks normally under pressure greater than atmospheric and sufficient to maintain said brake disks in released position disengaged from said brake ring; means for controlling the pressure of said fluid; and anchor pins fixedly positioned parallel to the axis of said ring and fitting through holes correspondingly located in said brake disks, for supporting said brake disks to prevent rotary movement of said disks but to permit self-centering movement of said disks parallel to the axis of said ring; the braking effort being supplied by spring force in said brake disks.

14. A brake according to claim 13 including friction lining attached to each said disk between said disk and said ring, a substantially annular outer seal between said disks and a substantially annular inner seal between said disks, in which said fluid is present in the substantially annular space bounded by said outer seal, said inner seal, and said brake disks, the outer portions of said disks normally being forced apart by said fluid, to maintain said friction lining away from contact with said ring.

15. A brake according to claim 14 in which said means for controlling the pressure of said fluid comprises adjustable valve means, connected by at least one supply line and at least one inlet to said substantially annular space, to provide braking by reducing said fluid pressure such that said outer portions of said disks are forced toward said ring by the spring force of said disks and press said friction lining against said ring.

References Cited in the file of this patent

UNITED STATES PATENTS

| | | |
|---|---|---|
| 2,211,191 | Wolfram | Aug. 13, 1940 |
| 2,381,941 | Wellman et al. | Aug. 14, 1945 |
| 2,451,335 | Groves | Oct. 12, 1948 |
| 2,484,888 | Hollerith | Oct. 18, 1949 |
| 2,619,212 | Cardwell et al. | Nov. 25, 1952 |
| 2,621,768 | Cardwell et al. | Dec. 16, 1952 |

FOREIGN PATENTS

| | | |
|---|---|---|
| 543,844 | France | June 10, 1922 |